United States Patent
Pulicharla et al.

(10) Patent No.: US 11,687,589 B2
(45) Date of Patent: *Jun. 27, 2023

(54) AUTO-POPULATING IMAGE METADATA

(71) Applicant: Rovi Guides, Inc., San Jose, CA (US)

(72) Inventors: Durga Prasad Pulicharla, Andhra Pradesh (IN); Madhusudhan Srinivasan, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/556,576

(22) Filed: Dec. 20, 2021

(65) Prior Publication Data

US 2022/0207082 A1    Jun. 30, 2022

Related U.S. Application Data

(63) Continuation of application No. 16/582,145, filed on Sep. 25, 2019, now Pat. No. 11,238,094.

(51) Int. Cl.
*G06F 3/048*    (2013.01)
*G06F 16/738*    (2019.01)
*G06F 16/783*    (2019.01)
*G06F 3/04883*    (2022.01)
*G06F 16/732*    (2019.01)

(52) U.S. Cl.
CPC ........ *G06F 16/738* (2019.01); *G06F 3/04883* (2013.01); *G06F 16/7328* (2019.01); *G06F 16/783* (2019.01)

(58) Field of Classification Search
None
See application file for complete search history.

(56) References Cited

U.S. PATENT DOCUMENTS

| | | |
|---|---|---|
| 5,222,155 A | 6/1993 | Delanoy et al. |
| 7,761,892 B2 | 7/2010 | Ellis et al. |
| 11,238,094 B2 | 2/2022 | Pulicharla et al. |
| 2008/0086688 A1* | 4/2008 | Chandratillake ..... G06F 16/738 707/E17.028 |
| 2011/0093492 A1 | 4/2011 | Sull et al. |
| 2011/0225136 A1* | 9/2011 | Tu .......................... G06V 20/46 707/706 |
| 2014/0177964 A1 | 6/2014 | Godlewski et al. |
| 2021/0089575 A1 | 3/2021 | Pulicharla et al. |

* cited by examiner

*Primary Examiner* — William C Trapanese
(74) *Attorney, Agent, or Firm* — Haley Guiliano LLP

(57) ABSTRACT

Methods and systems for auto-populating image metadata are described herein. The system receives or accesses an image. The system then generates a link to a video having a frame that corresponds to the image. To generate the link, the system searches for a video having a frame comprising a portion of the image and generates the link such that the link comprises a timestamp of the frame. The system then modifies the metadata of the image to include the link. Once a user interaction with the image is detected, the system may follow the link to generate for display the video beginning at the timestamp.

20 Claims, 8 Drawing Sheets

AUTO-POPULATING IMAGE METADATA

CROSS-REFERENCE TO RELATED APPLICATIONS

This application is a continuation of U.S. patent application Ser. No. 16/582,145 (now allowed), filed Sep. 25, 2019, which is hereby incorporated by reference herein in its entireties.

BACKGROUND

The present disclosure is directed to auto-populating metadata in images and, more particularly, to populating images with source metadata.

SUMMARY

Current communications platforms enable users to easily exchange images, such as screenshots, memes, GIFs, and other types of images. Oftentimes, these images are a reference to content, such as a televised event, a show or movie, an interview, a song, or another type of content item. For example, the image may be a screenshot from a television show with a humorous caption overlaid onto the image (e.g., a meme). In another example, the image may show a person performing an action that mirrors an action performed by a celebrity (e.g., a GIF). The recipient of such an image must know the source content upon which the image is based in order to understand the image. If the user is unfamiliar with the source content, the image is ineffective as a method of communication. Current systems lack the ability to provide the recipient of the image with source information which gives context to the image. The source image should not merely be the location from which the image was obtained but should instead provide context to the image such that the user may understand the communication. The applications within which the image is exchanged and the server do not have access to information about the media from which the image was derived, nor do they possess a means for communicating information about the source of the image to the recipient. Systems are needed which are able to obtain and convey precise context of source information to a recipient of an image.

Solutions to the problem described above include modifying the image to include metadata comprising a link. In some embodiments, to generate the link, an application may search for a video having a frame that matches the image. The application may then generate the link to the video. In some embodiments, the link comprises a timestamp at which the frame appears in the video to enable the user to immediately access the relevant portion of the video an understand the context of the image. The application may monitor user activity for an interaction with the image. An interaction may be, for example, a click, a tap, a double tap, a press, or a swipe. Once an interaction is detected, the application may follow the link to generate for display the video beginning from the timestamp. This process enables the application to populate the image with source metadata such that the user is able to follow a link to the source in order to understand the context of the image.

In some embodiments, a server may obtain and provide source information for an image. For example, the server may receive a request from an application to annotate an image with source metadata. The server may then search for a video having a frame that matches the image. The server may then generate a link to the video having a timestamp of the frame. Finally, the server may send the link to the application for inclusion in the metadata of the image. The link may then be followed in response to a user interaction with the image in order to generate for display the video beginning at the timestamp. This process enables a server to obtain and provide source information about the image.

In some embodiments, the application or server may identify and provide multiple links to multiple sources matching the image. For example, the multiple sources may be different providers of the same content matching the image. In some embodiments, the multiple sources may each have a variation of the content item matching the image. The application or server may store or send a link to each of the sources in the metadata and provide a link to the user based on user permissions to the sources, relevance, user preferences, or any other criteria. In some embodiments, the application or server may update the multiple links in the metadata when new sources are found.

It should be noted that the systems and methods described herein for one embodiment may be combined with other embodiments as discussed herein.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Methods and systems are described herein for auto-populating image metadata with source information. When an image is exchanged within an application, the image is analyzed for defining characteristics, such as objects, actions, or contexts within the image. The system then compares these characteristics with characteristics of source content. Once the system identifies a matching frame in a source content item, the system modifies the metadata of the image to include a link to the source content. The link may include a timestamp of the time in the content at which the matching frame occurs. If the user subsequently interacts with the image (e.g., clicks to request source information), the system will follow the link to generate for display the source content.

Figure 1:
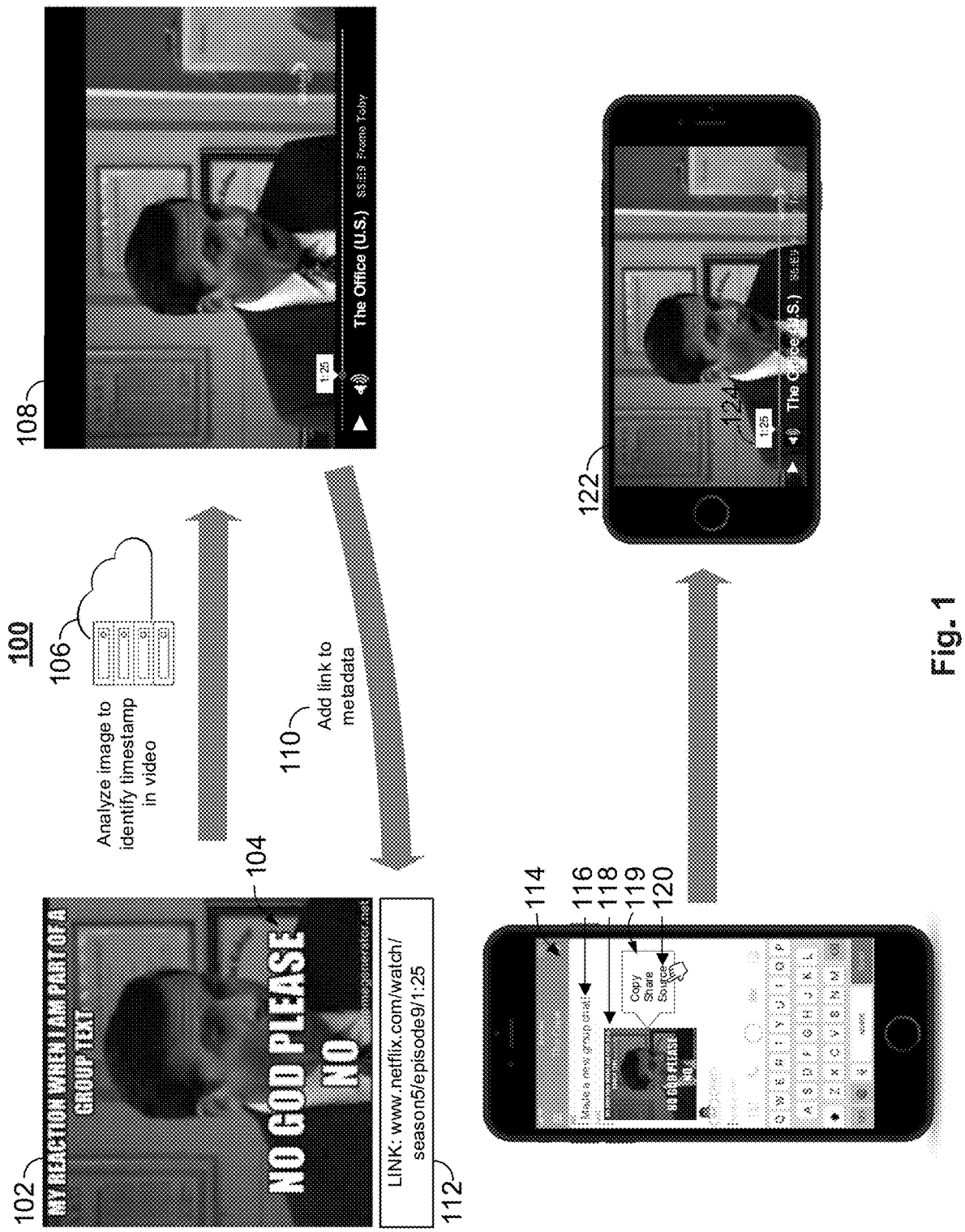
FIG. 1 shows an illustrative example of populating metadata of an image with source information, in accordance with some embodiments of the disclosure.

FIG. 1 shows an illustrative example of populating metadata of an image with source information, in accordance with some embodiments of the disclosure. In FIG. 1, the system (i.e., an application) accesses an image (e.g., image 102), which is a screenshot from a show (i.e., "The Office") with text added to the screenshot. The system analyzes image 102 in order to identify characteristics of the image. For example, the system may identify objects within the image. In image 102, the system may identify a person (i.e., character Michael Scott from "The Office") in the image. In some embodiments, the system may use object detection techniques in order to identify objects within the image. In some embodiments, the system may identify other characteristics within the image, such as actions, contexts, themes, any other characteristics, or any combination thereof.

Once the system has identified the object of image 102, the system may access server 106 in order to identify source content which corresponds to the image. The server (e.g., server 106) may comprise a database of content or may be able to access multiple external databases of content. The system may utilize a web crawler in order to identify a content item having a frame which matches the image. In some embodiments, the system may use image comparison techniques such as frame comparison, object recognition, image analysis, any other form of image comparison, or any combination thereof. In some embodiments, the system may use fuzzy matching in order to identify a frame of a content item which closely resembles the image. Fuzzy matching may be performed as described in U.S. Pat. No. 5,222,155, which is hereby incorporated by reference. In some embodiments, the system may identify a pixel match threshold (e.g., 96%), above which the system will determine the frame and image to be matching and below which the system will determine the frame and image not to be matching. In some embodiments, the image may be a cropped version of the frame. In this instance, the system may compare the image to a portion of the frame which corresponds to the image. The system may perform any of the analyses described above to compare the image to the portion of the frame.

Once the system identifies a content item (e.g., content item 108) having a frame which corresponds to the image, the system may identify a timestamp at which the frame occurs. In content item 108, the frame occurs at time 1:25. The system then generates a link (e.g., link 112) to the content item, beginning at the frame. The system then adds link 112 to the metadata of image 102. The link may comprise a location of content item 108, the timestamp, and any other identifying information.

In some embodiments, image 102 is shared within an application (e.g., application 114) as a meme (e.g., meme 118). In some embodiments, application 114 may be a messaging application, a social media application, a communications application, a news application, or another type of application. In some embodiments, application 114 may perform the steps of searching for a source content item and generating a link. In some embodiments server 106 may perform all or some of these steps. In application 114, a first user types a message (e.g., message 116) indicating that the user has created a new group chat. In response, a second user shares meme 118, which is related to message 116. If a user receiving meme 118 in the group chat wishes to learn more information about the context of meme 118, the user may interact with the image (e.g., click, tap, double tap, press, or swipe) in order to bring up a menu of options (e.g., menu 119). In some embodiments, menu 119 may include an option (e.g., option 120) to view the "Source." In some embodiments, interacting with option 120 causes the application to follow the link 112 in order to generate for display the content item 108, which is a video (i.e., video 122). The system may then proceed to play video 112 starting at the frame corresponding to the image 102 (e.g., timestamp 124). In some embodiments, the video is generated for display on the same device where meme 118 was displayed on (e.g., in the same application or in a different application).

It will be understood that FIG. 1 is shown for illustrative purposes and that not all of the features need to be included. In some embodiments, additional features may be included as well.

Figure 2:
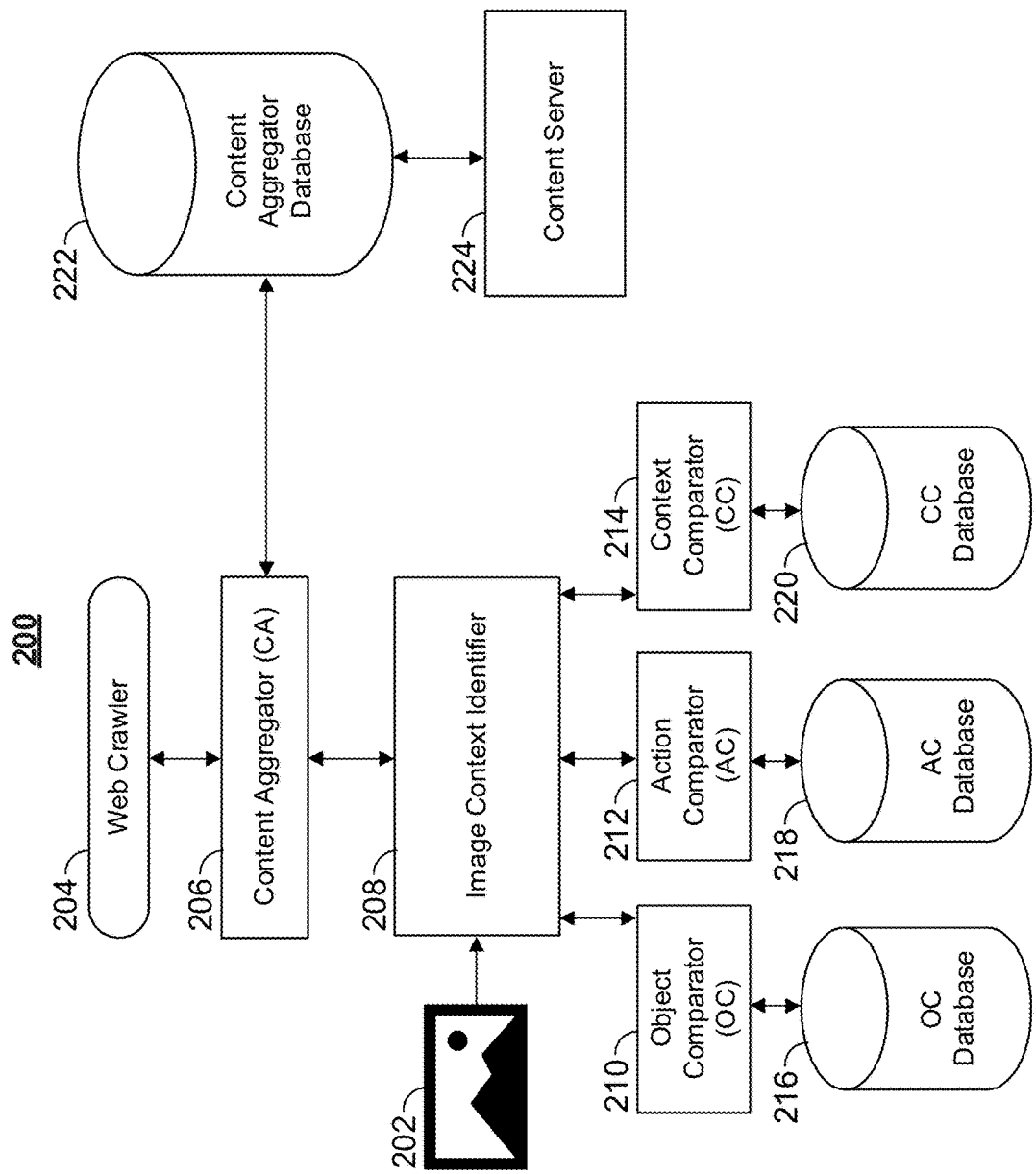
FIG. 2 shows an illustrative example of a system for obtaining and updating source metadata for an image, in accordance with some embodiments of the disclosure.
Figure 3:
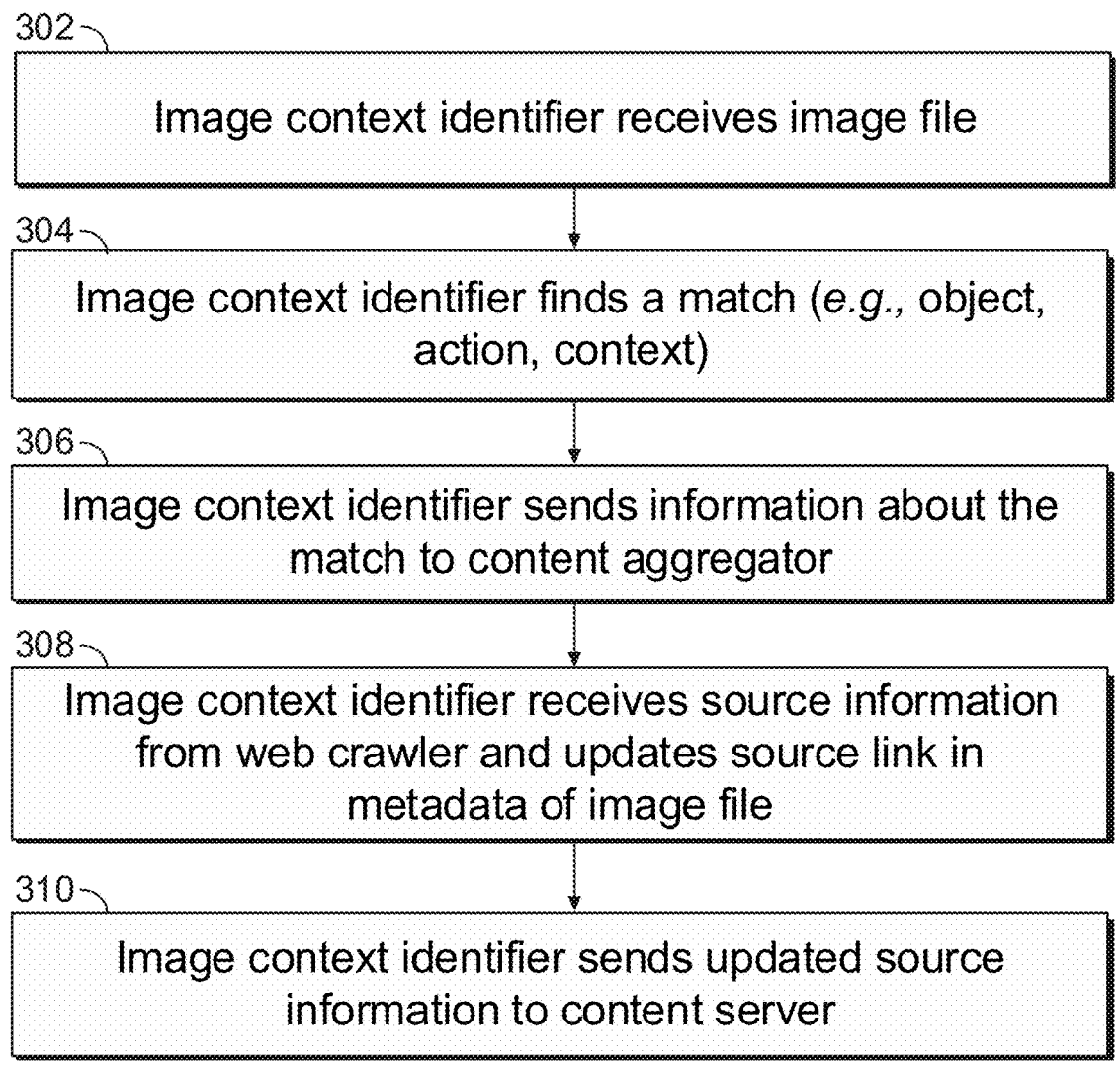
FIG. 3 is a flowchart of an illustrative process for obtaining and updating source metadata for an image, in accordance with some embodiments of the disclosure.

FIG. 2 shows an illustrative example of a system for obtaining and updating source metadata for an image, in accordance with some embodiments of the disclosure. In some embodiments, FIG. 2 functions in accordance with process 300 of FIG. 3. FIG. 3 is a flowchart of an illustrative process for obtaining and updating source metadata for an image, in accordance with some embodiments of the disclosure. It will be understood that process 300 is merely illustrative and that system 200 may function according to a number of other processes.

At step 302, the image context identifier (e.g., image context identifier 208) receives an image file (e.g., image file 202). In some embodiments, the image file may be a meme, GIF, still image, screenshot, or any other type of image file.

At step 304, the image context identifier 208 identifies a match. The match may be an object within the image file, an action performed within the image, or a context of the image. Image context identifier 208 may utilize an object comparator (e.g., object comparator 210), an action comparator (e.g., action comparator 212), or a context comparator (e.g., context comparator 214) in order to identify a match for the image. In some embodiments, object comparator 210 may access an object comparator database (e.g., OC database 216). The OC database 216 may include a number of objects to which the object comparator 210 can compare the image file 202. The objects may include characters, people, shapes representing objects, words, or any other objects. Object comparator 210 may identify an object within OC database 216 which matches an object within the image file 202. For instance, as in FIG. 1, the object comparator 210 may identify the actor Steve Carell as an object in the image. In some embodiments, the image context identifier 208 may utilize the action comparator 212 to match an action in the image with an action in an action comparator database (e.g., AC database 218). In some embodiments the image context identifier 208 may utilize the context comparator 214 to identify a conversation, post, article, video, or other content in a context comparator database (e.g., CC database 220) which included the image file 202. Based on descriptions or discussions of the image file 202 in the CC database 220, the context comparator 214 may be able to extract a context.

At step 306, the image context identifier 208 sends information about the match (i.e., from the object comparator 210, action comparator 212, or context comparator 214) to a content aggregator (e.g., content aggregator 206). In some embodiments, the content aggregator 206 may utilize a web crawler (e.g., web crawler 204) in order to search for content corresponding to the image file 202 in a database of content (e.g., content aggregator database 222). In some embodiments, the content aggregator 206 may search content aggregator database 222 using the objects, actions, and contexts identified by the image context identifier 208, or any combination thereof.

At step 308, the image context identifier 208 receives source information from the web crawler and updates the source link in the metadata of image file 202. In some embodiments, the source information may be a provider, or multiple providers, which make available a video having a frame that corresponds to the image file 202. In some embodiments, the source information may be a location at which the source content is stored. In some embodiments, the source information may include a timestamp of a frame in the source content which corresponds to the image file.

At step 310, the image context identifier 208 sends the updated source information to a content server (e.g., content server 224). The content server 224 may store the source information such that it may provide the source information if a similar image file should enter the system in the future.

It will be understood that diagram 200 and process 300 are merely illustrative and that various modifications can be made in accordance with the present disclosure.

Figure 4:
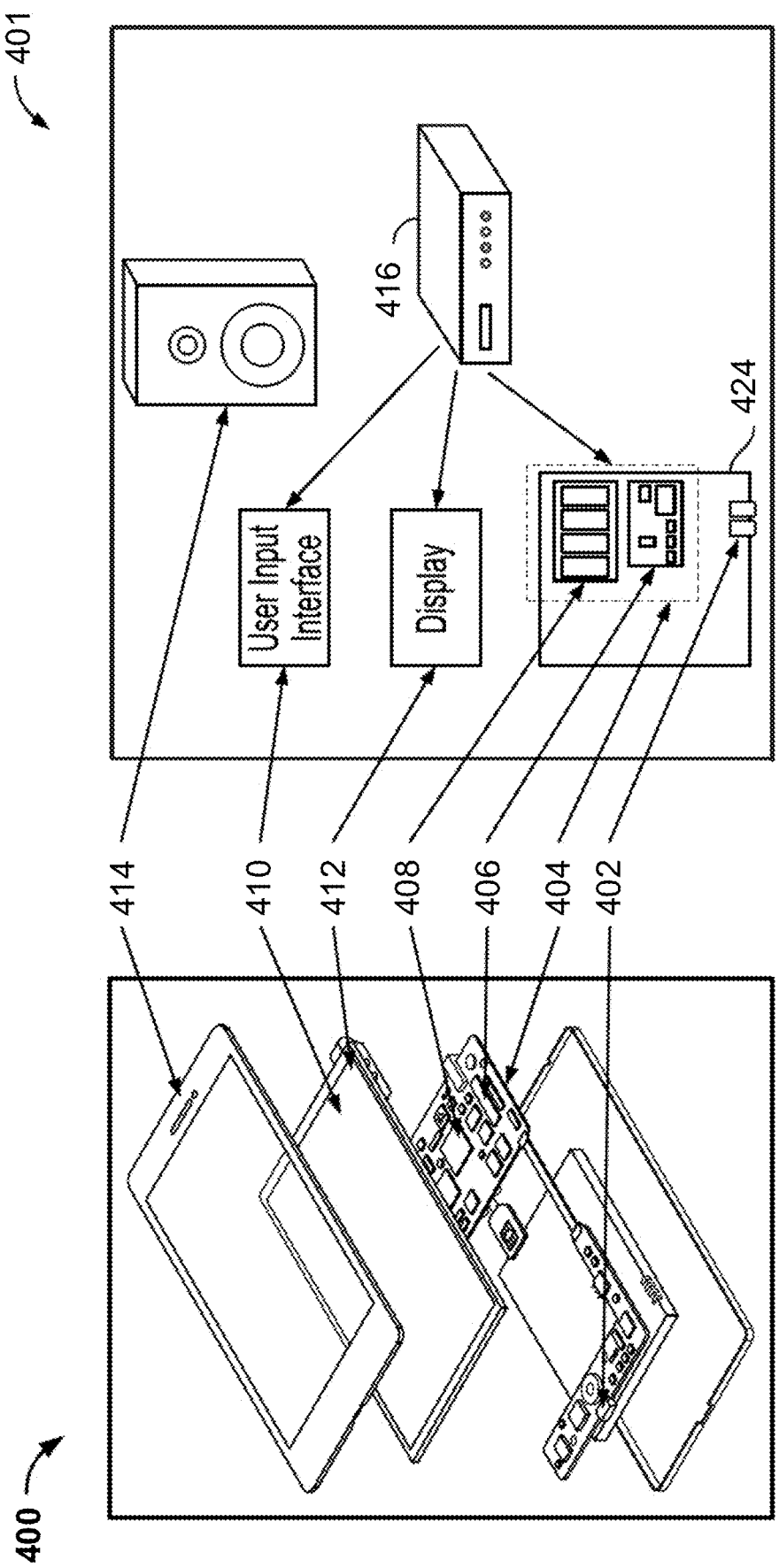
FIG. 4 is a block diagram of an illustrative user equipment, in accordance with some embodiments of the present disclosure.

FIG. 4 shows a generalized embodiment of illustrative media devices 400 and 401. As depicted, media device 400 may be a smartphone or tablet, whereas media device 401 may be a home media system that includes equipment device 416 (e.g., a set-top box, CPU, video-game console, etc.) powered by processor 424. Media devices 400 and 401 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for populating image metadata based on settings stored in memory (i.e., storage 408).

In client-server based embodiments, control circuitry 404 may include communications circuitry suitable for communicating with a video content server or other networks or servers. The instructions for carrying out the above-mentioned functionality may be stored on a server. Communications circuitry may include an integrated services digital network (ISDN) modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of media devices, or communication of media devices in locations remote from each other.

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Non-volatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MP3 decoders or other digital decoding circuitry, or any other suitable tuning or audio circuits or combinations of such circuits. Encoding circuitry (e.g., for converting over-the-air, analog, or digital signals to audio signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the media device to receive and to display, to play, or to record content. The tuning and encoding circuitry may also be used to receive guidance data. The circuitry described herein, including for example, the tuning, audio generating, encoding, decoding, encrypting, decrypting, scaler, and analog/digital circuitry, may be implemented using software running on one or more general purpose or specialized processors. Multiple tuners may be provided to handle simultaneous tuning functions. If storage 408 is provided as a separate device from user equipment 400, the tuning and encoding circuitry (including multiple tuners) may be associated with storage 408.

A user may send instructions to control circuitry 404 using user input interface 410 of media device 400 or user input interface 420 of media device 401. User input interface 410 and user input interface 420 may be any suitable user interface, such as a remote control, mouse, trackball, keypad, keyboard, touch screen, touchpad, stylus input, joystick, voice recognition interface, or other user input interfaces. Display 410 may be a touchscreen or touch-sensitive display. In such circumstances, user input interface 410 may be integrated with or combined with display 412. Display 422 may be provided as a stand-alone device or integrated with other elements of media device 401. Speakers 414 may be provided as integrated with other elements of media device 400. In the case of media device 401, speakers 418 may be stand-alone units (e.g., smart speakers). The audio component of videos and other content displayed on display 422 may be played through speakers 418. In some embodiments, the audio may be distributed to a receiver (not shown), which processes and outputs the audio via speakers 418.

The metadata population may be implemented using any suitable architecture. For example, it may be a stand-alone application wholly-implemented on media device 400. The metadata population and/or any instructions for performing any of the embodiments discussed herein may be encoded on computer readable media. Computer readable media includes any media capable of storing data. In some embodiments, the metadata population is a client-server based application. Data for use by a thick or thin client implemented on media device 400 or media device 401 is retrieved on-demand by issuing requests to a server remote to the media device 400 or media device 401, respectively. For example, media device 400 may receive inputs from the user via input interface 410 and transmit those inputs to the remote server for processing and generating the corresponding outputs. The generated output is then transmitted to media device 400 for presentation to the user.

Figure 5:
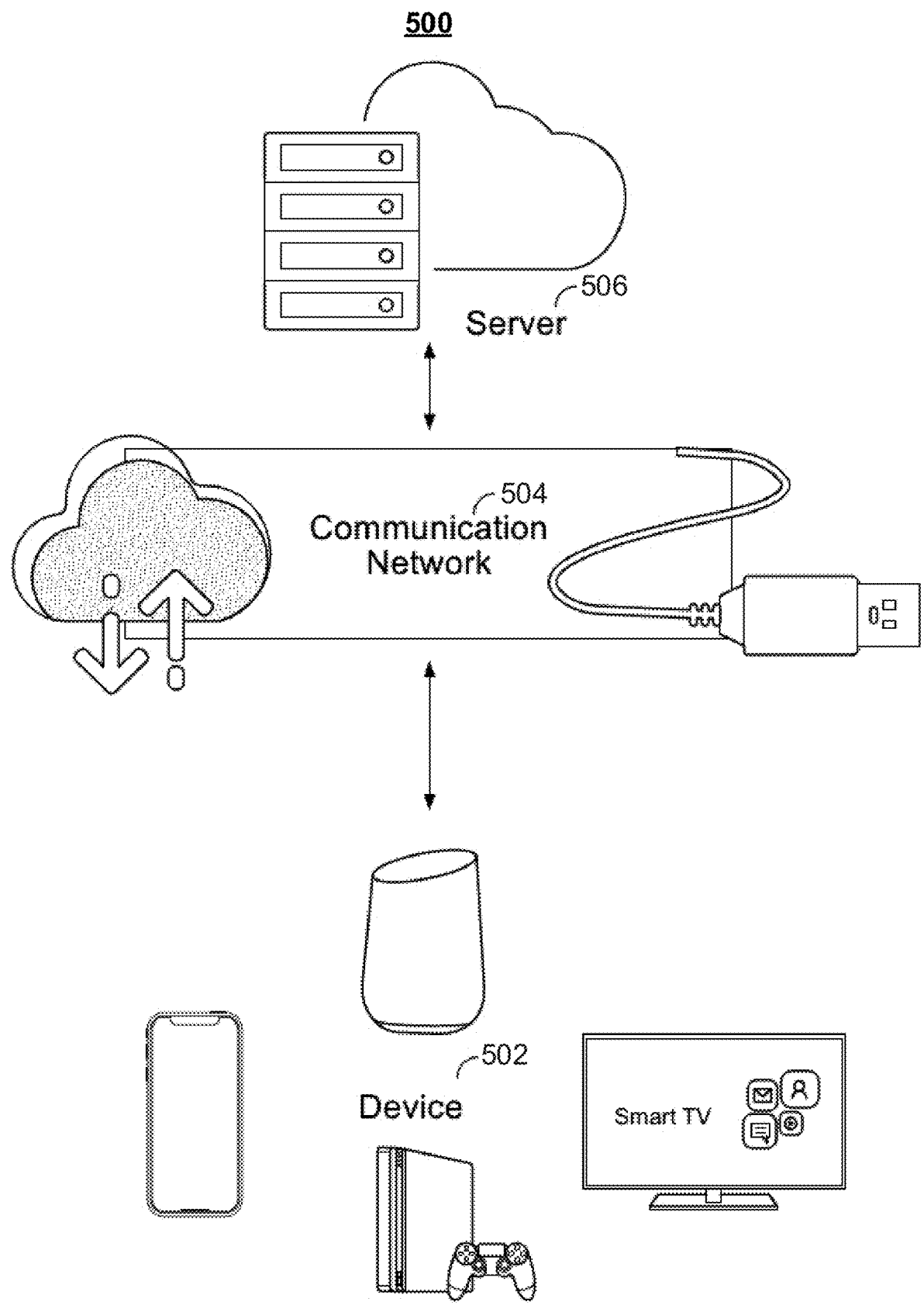
FIG. 5 is a block diagram of an illustrative media system, in accordance with some embodiments of the disclosure.

Media device 400 and media device 401 of FIG. 4 can be implemented in system 500 of FIG. 5 as device 502. Media devices, on which metadata population may be implemented, may function as a standalone device or may be part of a network of devices. Various network configurations of devices may be implemented and are discussed in more detail below.

In system 500, there may be multiple media devices but only one of each is shown in FIG. 5 to avoid overcomplicating the drawing. In addition, each user may utilize more than one type of media device and also more than one of each type of media device.

Device 502 may be coupled to communication network 504. Communication network 504 may be one or more networks including the Internet, a mobile phone network, mobile voice or data network (e.g., a 4G or LTE network), cable network, public switched telephone network, or other types of communications network or combinations of communications networks. Server 506, a processing server, and device 502 may be connected to communication path 504 via one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths.

Although communications paths are not drawn between device 502, server 506 and a processing server, these devices may communicate directly with each other via communication paths, such as short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The media devices may also communicate with each other directly through an indirect path via communication network 504.

System 500 includes server 506 coupled to communication network 504. There may be more than one of server 506, but only one is shown in FIG. 5 to avoid overcomplicating the drawing. Server 506 may include one or more types of content distribution equipment including a television distribution facility, cable system headend, satellite distribution facility, programming sources (e.g., television broadcasters, etc.), intermediate distribution facilities and/or servers, Internet providers, on-demand media servers, and other content providers. Server 506 may be the originator of content (e.g., a television broadcaster, a Webcast provider, etc.) or may not be the originator of content (e.g., an on-demand content provider, an Internet provider of content of broadcast programs for downloading, etc.). Server 506 may include cable sources, satellite providers, on-demand providers, Internet providers, over-the-top content providers, or other providers of content. Server 506 may also include a remote media server used to store different types of content (including video content selected by a user), in a location remote from any of the media devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety. Server 506 may also provide metadata.

Metadata population may be, for example, stand-alone applications implemented on media devices. For example, the metadata population may be implemented as software or a set of executable instructions which may be stored in storage 408, and executed by control circuitry 404 of a device 502. In some embodiments, metadata population may be a client-server application where only a client application resides on the media device, and server application resides on a processing server. For example, metadata population may be implemented partially as a client application on control circuitry 404 of device 502 and partially on a processing server as a server application running on control circuitry of a processing server. When executed by control circuitry of a processing server, the metadata population system may instruct the control circuitry to generate the metadata population output (e.g., image metadata which has been populated with source information) and transmit the generated output to device 502. The server application may instruct the control circuitry of the server 506 to transmit metadata for storage on device 502. The client application may instruct control circuitry of the receiving device 502 to generate the metadata output.

Device 502 may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." Cloud resources may be accessed by device 502 using, for example, a web browser, a desktop application, a mobile application, and/or any combination of access applications of the same. Device 502 may be a cloud client that relies on cloud computing for application delivery, or the media device may have some functionality without access to cloud resources. For example, some applications running on device 502 may be cloud applications, i.e., applications delivered as a service over the Internet, while other applications may be stored and run on the media device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, media devices can use cloud resources for processing operations such as the processing operations performed by processing circuitry described in relation to FIG. 4. Further details of the present disclosure are discussed below in connection with the flowcharts of FIGS. 6-8.

Figure 6:
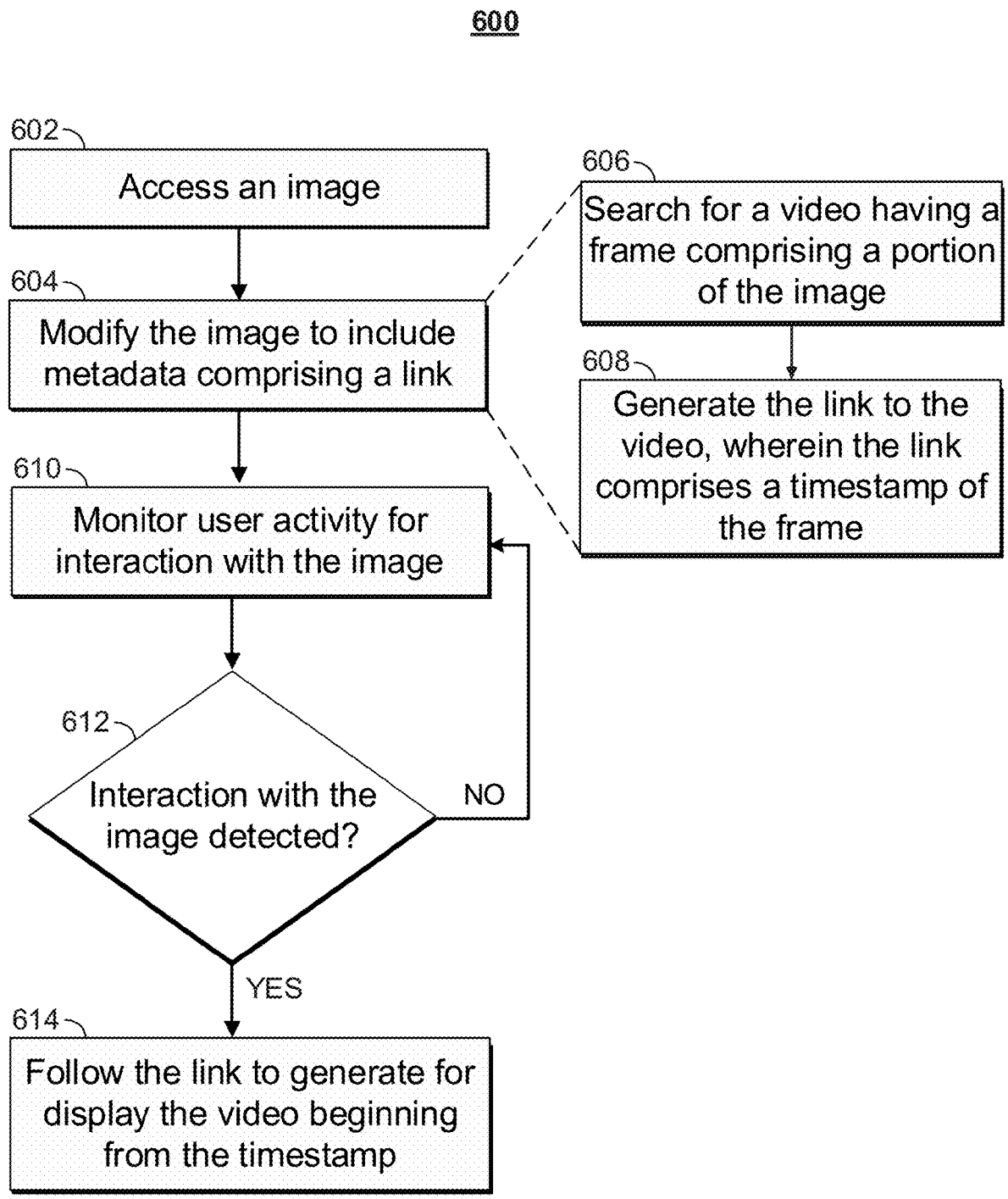
FIG. 6 is a flowchart of an illustrative process for providing, via an application, a link to a video corresponding to an image, in accordance with some embodiments of the disclosure.

FIG. 6 is a flowchart of an illustrative process for providing, via an application, a link to a video corresponding to an image, in accordance with some embodiments of the disclosure. As shown in FIG. 6, process 600 identifies a video that corresponds to the image and modifies the metadata of the image to include a link to the video. When a subsequent interaction with the image is detected, the application can follow the link in order to display the video.

At step 602, the application (e.g., using control circuitry 404) accesses an image. In some embodiments, the image may be an image (e.g., meme, GIF, still image, video, etc.) that has been shared within the application.

At step 604, the application modifies the image to include metadata comprising a link. The modifying of the image may be performed by the process outlined in steps 606 and 608 or by any other means.

At step 606, the system searches (e.g., using network 504) for a video having a frame comprising a portion of the image. In some embodiments, the system may access a database of content (e.g., stored on server 506) in order to analyze videos for frames corresponding to the image. The system may use any technique to analyze and compare the image to the frames of videos, such as frame comparison, object recognition, image analysis, any other form of image comparison, or any combination thereof. In some embodiments, the system may use fuzzy matching in order to identify a frame of a content item which closely resembles the image. For example, the system may identify a pixel match threshold (e.g., 96%), above which the system will determine the frame and image to be matching and below which the system will determine the frame and image not to be matching. In some embodiments, the image may be a cropped version of the frame. In this instance, the system may compare the image to a portion of the frame which corresponds to the image. The system may perform any of the analyses described above to compare the image to the portion of the frame. In some embodiments, if the image comprises overlaid text (e.g., such as in a meme), the system may remove the text from the image before performing the search, for example, through the use of a neural network. For example, the neural network may be trained by adding text to an image, feeding the modified image through the neural network and adjusting the neural network based on how closely the output of the neural network resembles the original image (before text addition).

At step 608, the system generates the link to the video. In some embodiments, the link comprises a timestamp of the frame which corresponds to the image. The link may additionally include information about the source of the video, the location at which the video is stored, access information such as any requirements for viewing the video, any other source information, or any combination thereof.

At step 610, the application monitors user activity (e.g., using user input interface 410) for any interactions with the image. In some embodiments, an interaction may be a click, a tap, a double tap, a press, or a swipe. For example, as in FIG. 1, a user may "right click" on the image in order to access a menu of options for the image.

At step 612, the application determines whether interaction with the image has been detected. For example, the application may receive information on interactions with the image from user input interface 410. If an interaction has been detected, process 600 proceeds to step 614. If no interaction was detected, process 600 returns to step 610 and continues monitoring for user activity.

At step 614, the application follows the link to generate for display the video beginning from the timestamp. In some embodiments, the application may launch an alternate application in which the video is located. For example, the video may be streamed on device 502 via network 504 from Server 506.

It will be understood that process 600 is merely illustrative and that various modifications can be made in accordance with the present disclosure.

Figure 7:
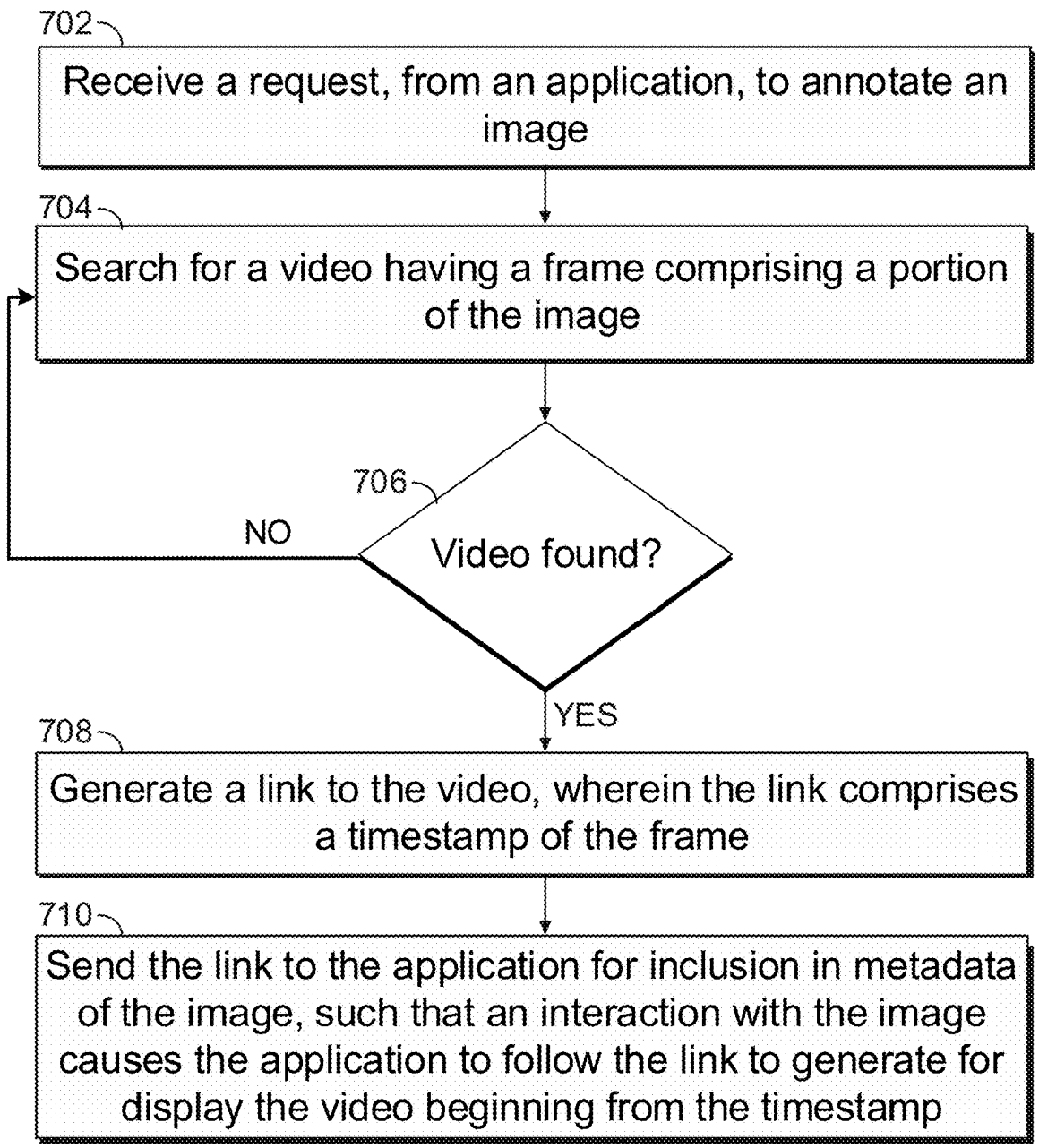
FIG. 7 is a flowchart of an illustrative process for providing, via a server, a link to a video corresponding to an image, in accordance with some embodiments of the present disclosure.

FIG. 7 is a flowchart of an illustrative process for providing, via a server, a link to a video corresponding to an image, in accordance with some embodiments of the present disclosure. As shown in FIG. 7, process 700 searches (e.g., using network 504) for a video having a frame which corresponds to a portion of the image. The server then generates a link to the video and includes in the link a timestamp of the frame. The server sends the link to the application for inclusion in metadata of the image.

At step 702, the sever receives a request, from an application, to annotate an image. In some embodiments, the server may receive the request in response to the image being shared within the application. In some embodiments, the server may receive the request in response to a user interaction with the image within the application (e.g., via user input interface 410).

At step 704, the server searches (e.g., using network 504) for a video having a frame comprising a portion of the image. In some embodiments, the system may access a database of content (e.g., stored on server 506) in order to analyze videos for frames corresponding to the image. The server may use any techniques to analyze and compare the image to the frames of videos, such as frame comparison, object recognition, image analysis, any other form of image comparison, or any combination thereof. In some embodiments, the server may use fuzzy matching in order to identify a frame of a content item which closely resembles the image. For example, the server may identify a pixel match threshold (e.g., 96%), above which the system will determine the frame and image to be matching and below which the system will determine the frame and image not to be matching. In some embodiments, the image may be a cropped version of the frame. In this instance, the system may compare the image to a portion of the frame which corresponds to the image. The server may perform any of the analyses described above to compare the image to the portion of the frame. In some embodiments, if the image comprises overlaid text (e.g., such as in a meme), the system may remove the text from the image before performing the search, for example, through the use of a neural network.

At step 706, the server determines if a video is found. If a video is found, process 700 proceeds to step 708. If no video is found, process 700 returns to step 704 and continues searching for a video.

At step 708, the server generates a link to the video, wherein the link comprises a timestamp of the frame. The link may additionally include information about the source of the video, the location at which the video is stored, access information such as any requirements for viewing the video, any other source information, or any combination thereof.

At step 710, the server sends the link to the application for inclusion in metadata of the image, such that an interaction with the image causes the application to follow the link to generate for display the video beginning from the timestamp. In some embodiments, the link may launch an alternate application in which the video is located. For example, the video may be streamed on device 502 via network 504 from Server 506.

It will be understood that process 700 is merely illustrative and that various modifications can be made in accordance with the present disclosure.

Figure 8:
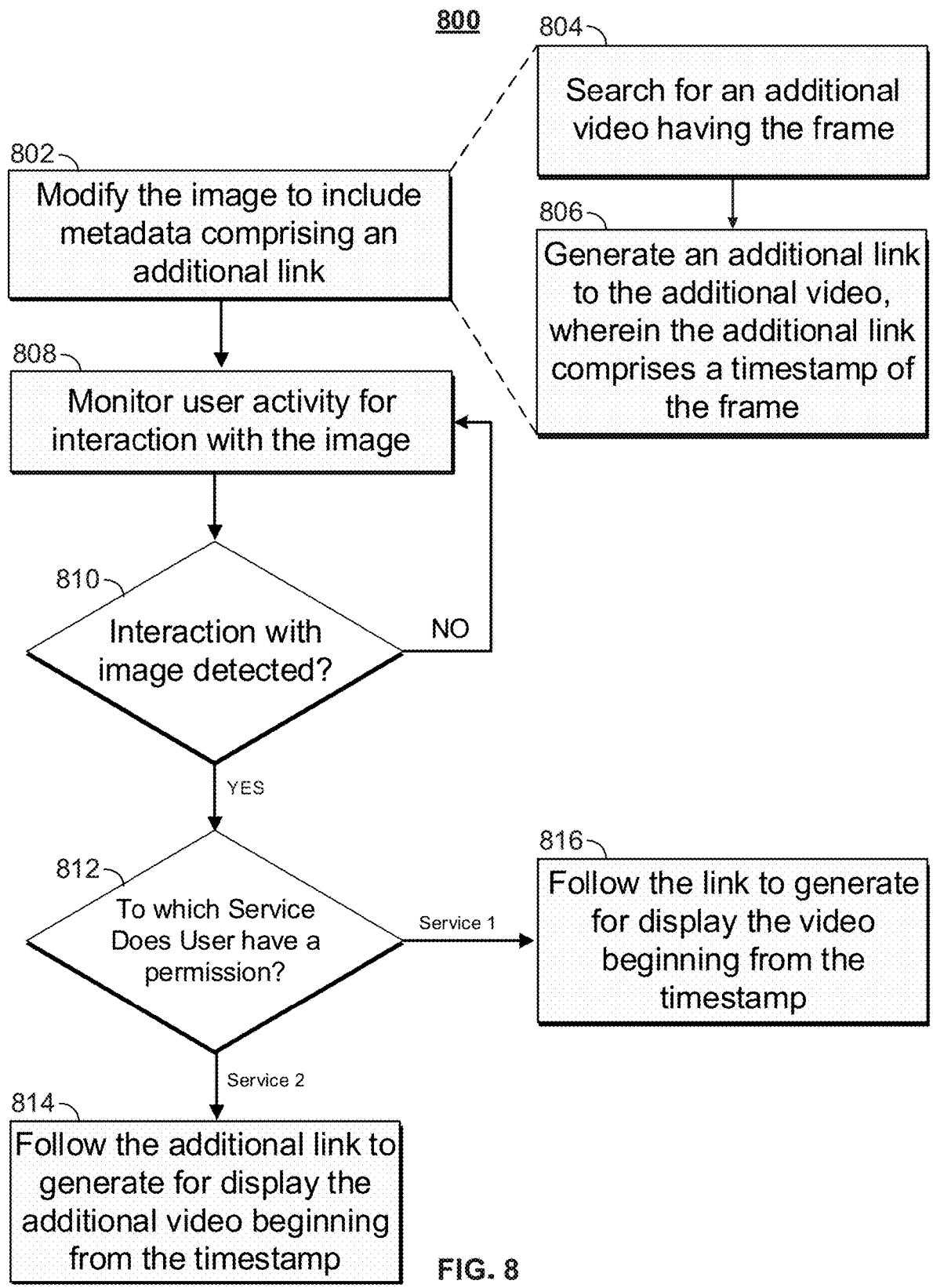
FIG. 8 is a flowchart of an illustrative process for providing an additional link to an additional video corresponding to an image, in accordance with some embodiments of the disclosure.

FIG. 8 is a flowchart of an illustrative process for providing an additional link to an additional video corresponding to an image, in accordance with some embodiments of the disclosure. As shown in FIG. 8, process 800 modifies the image to include metadata comprising an additional link to an additional video having a frame corresponding to the image. The system (i.e., application or server) may then follow the additional link to display the additional video.

At step 802, the system modifies the image to include metadata comprising an additional link. The system may modify the image by the process outlined in steps 804 or 806 or by any other means.

At step 804, the system searches (e.g., using network 504) for an additional video having the frame. In some embodiments, the system may access a database of content (e.g., stored on server 506) in order to analyze videos for frames corresponding to the image. The system may use any techniques to analyze and compare the image to the frames of videos, such as frame comparison, object recognition, image analysis, any other form of image comparison, or any combination thereof. In some embodiments, the system may use fuzzy matching in order to identify a frame of a content item which closely resembles the image. For example, the system may identify a pixel match threshold (e.g., 96%), above which the system will determine the frame and image to be matching and below which the system will determine the frame and image not to be matching. In some embodiments, the image may be a cropped version of the frame. In this instance, the system may compare the image to a portion of the frame which corresponds to the image. The system may perform any of the analyses described above to compare the image to the portion of the frame. In some embodiments, if the image comprises overlaid text (e.g., such as in a meme), the system may remove the text from the image before performing the search, for example, through the use of a neural network. In some embodiments, the system already identified an additional video, for example, at step 606 of FIG. 6 or step 704 of FIG. 7. In this case, the system may select as the additional video a video that was previously identified but that was not selected as the linked video.

At step 806, the system generates an additional link to the additional video, wherein the additional link comprises a timestamp of the frame. The link may additionally include information about the source of the video, the location at which the video is stored, access information such as any requirements for viewing the video, any other source information, or any combination thereof.

At step 808, the system monitors user activity (e.g., using user input interface 410) for an interaction with the image. In some embodiments, an interaction may be a click, a tap, a double tap, a press, or a swipe. For example, as in FIG. 1, a user may "right click" on the image in order to access a menu of options for the image.

At step 810, the system determines whether interaction with the image has been detected. For example, the application may receive information on interactions with the image from user input interface 410. If an interaction has been detected, process 800 proceeds to step 812. If no interaction was detected, process 800 returns to step 808 and continues monitoring for user activity.

At step 812, the system determines which user permissions the user possesses. For example, the video and the additional video may be located in two separate sources (e.g., two video streaming services). The user may have access to one streaming service, neither, or both. If the user has permissions for a first video source (e.g., Netflix), process 800 proceeds to step 816. If the user has permissions for a second video source (e.g., Amazon Prime), but not for the first video source, process 800 proceeds to step 814. If the user has permissions for both video sources, the system may proceed to step 814 or step 816 based on other factors, such as video quality, user preferences between the sources, cost of access for the sources, any other factor, or any combination thereof. If the user does not have permissions for either source, process 800 may return to step 804 in order to find an alternative video from an alternative link.

At step 814, the system follows the additional link to generate for display the additional video beginning from the timestamp. In some embodiments, the application may launch an alternate application based on the source of the additional video.

At step 816, the system follows the link to generate for display the video beginning from the timestamp. In some embodiments, the application may launch an alternate application based on the source of the video. For example, the video may be streamed on device 502 via network 504 from Server 506.

It will be understood that process 800 is merely illustrative and that various modifications can be made in accordance with the present disclosure.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
   receiving a message comprising an image;
   searching a content database to identify video content corresponding to the image;
   generating a link to the video content, wherein the link identifies a location within the video content that corresponds to the image;
   in response to the receiving the message comprising the image and the identifying the video content corresponding to the image, modifying the image of the message to comprise the generated link that identifies the location within the video content that corresponds to the image;
   wherein, selection of the modified image via a user interface of client device causes the client device to generate for display the video content beginning at the location within the video content that corresponds to the image.

2. The method of claim 1, wherein the image is received from a messaging application.

3. The method of claim 1, wherein the selection via the user interface of client device is one of a click, a tap, a double tap, a press, or a swipe.

4. The method of claim 1, further comprising modifying the image to include an additional link, wherein the additional link is generated by:

searching the content database for additional video content comprising the image; and generating an additional link to a location within the additional video content that corresponds to the image.

5. The method of claim 1, wherein identifying the location within the video content that corresponds to the image comprises identifying a frame of the video content that comprises the image.

6. The method of claim 5, wherein identifying a frame of the video content that comprises the image comprises determining that a percentage of pixels from the image that match a portion of the frame of the video content is greater than a threshold value.

7. The method of claim 1, wherein the image comprises text and wherein the method further comprises removing the text from the image prior to the searching the content database for the video content.

8. The method of claim 1, wherein modifying the image of the message comprises adding additional information corresponding to a source of the image.

9. The method of claim 1, wherein the selection of the modified image causes the client device to display the video content by launching an application in which the video content is available to be displayed.

10. The method of claim 1, further comprising transmitting the message comprising the modified image to the client device.

11. A system comprising:

input/output circuitry configured to receive a message comprising an image;

control circuitry configured to:

search a content database to identify video content corresponding to the image;

generate a link to the video content, wherein the link identifies a location within the video content that corresponds to the image;

in response to the receiving the message comprising the image and the identifying the video content corresponding to the image, modify the image of the message to comprise the generated link that identifies the location within the video content that corresponds to the image;

wherein, selection of the modified image via a user interface of client device causes the client device to generate for display the video content beginning at the location within the video content that corresponds to the image.

12. The system of claim 11, wherein the image is received in a messaging application.

13. The system of claim 11, wherein the selection via the user interface of client device is one of a click, a tap, a double tap, a press, or a swipe.

14. The system of claim 11, wherein the control circuitry is further configured to modify the image to include an additional link, wherein the control circuitry is configured to generate the additional link by:

searching the content database for additional video content comprising the image; and generating an additional link to a location within the additional video content that corresponds to the image.

15. The system of claim 11, wherein the control circuitry is configured to identify the location within the video content that corresponds to the image by identifying a frame of the video content that comprises the image.

16. The system of claim 15, wherein control circuitry is configured to identify a frame of the video content that comprises the image by determining that a percentage of pixels from the image that match a portion of the frame of the video content is greater than a threshold value.

17. The system of claim 11, wherein the image comprises text and wherein the control circuitry is further configured to remove the text from the image prior to the searching the content database for the video content.

18. The system of claim 11, wherein the control circuitry is configured to, when modifying the image of the message, add additional information corresponding to a source of the image.

19. The system of claim 11, wherein the selection of the modified image causes the client device to follow the link by launching an application in which the video content is available to be displayed.

20. The system of claim 10, wherein the control circuitry is further configured to transmit the message comprising the modified image to the client device.

* * * * *